(12) United States Patent
Holtzman et al.

(10) Patent No.: US 7,043,760 B2
(45) Date of Patent: May 9, 2006

(54) SYSTEM AND METHOD FOR ESTABLISHING AND MANAGING RELATIONSHIPS BETWEEN PSEUDONYMOUS IDENTIFICATIONS AND MEMBERSHIPS IN ORGANIZATIONS

(75) Inventors: David Holtzman, Herndon, VA (US); David Pool, Winchester, VA (US)

(73) Assignee: David H. Holtzman, Herndon, VA (US)

( * ) Notice: Subject to any disclaimer, the term of this patent is extended or adjusted under 35 U.S.C. 154(b) by 923 days.

(21) Appl. No.: 09/897,473

(22) Filed: Jul. 3, 2001

(65) Prior Publication Data

US 2005/0091543 A1    Apr. 28, 2005

Related U.S. Application Data

(63) Continuation-in-part of application No. 09/795,968, filed on Mar. 1, 2001, which is a continuation-in-part of application No. 09/686,516, filed on Oct. 11, 2000.

(51) Int. Cl.
*H04L 9/32* (2006.01)
*H04K 1/00* (2006.01)

(52) U.S. Cl. .................. 726/28; 713/158; 713/176; 726/4; 705/12; 705/74

(58) Field of Classification Search ............. 713/150, 713/155–159, 168, 175, 176, 182–186, 200–202; 705/1, 12, 50, 64–66, 72, 74
See application file for complete search history.

(56) References Cited

U.S. PATENT DOCUMENTS

| | | | |
|---|---|---|---|
| 6,029,195 A | 2/2000 | Herz | |
| 6,061,789 A * | 5/2000 | Hauser et al. | 713/168 |
| 6,081,793 A | 6/2000 | Challener et al. | |
| 6,324,648 B1 * | 11/2001 | Grantges, Jr. | 713/201 |
| 6,678,516 B1 * | 1/2004 | Nordman et al. | 455/414.1 |
| 6,889,325 B1 * | 5/2005 | Sipman et al. | 713/176 |
| 6,892,944 B1 * | 5/2005 | Chung et al. | 235/386 |
| 2001/0011351 A1 * | 8/2001 | Sako | 713/180 |
| 2001/0020228 A1 | 9/2001 | Cantu et al. | |
| 2001/0034708 A1 | 10/2001 | Walker et al. | |

(Continued)

OTHER PUBLICATIONS

Housley et al, "Internet X.509 Public Key Infrastructure Certificate and CRL Profile", Jan. 1999, Network Working Group Request for Comments: 2459, p. 1-129.*

(Continued)

*Primary Examiner*—Christopher Revak
(74) *Attorney, Agent, or Firm*—Birch, Stewart, Kolasch & Birch, LLP.

(57) ABSTRACT

A system and method for bonding a pseudonymous identity to an organization to provide assurance that a user claiming to be a member or representative of the organization may anonymously post messages or documents to electronic forum. The system and method includes distribution of tokens from an authentication authority to the organization which can then be provided by the organization to its members. Members register with the authentication authority and designate a pseudonym to associate with the organization and also provide the membership token as proof of membership in the organization.

39 Claims, 4 Drawing Sheets

U.S. PATENT DOCUMENTS

2003/0034393 A1* 2/2003 Chung ......................... 235/386
2003/0062411 A1* 4/2003 Chung et al. ................ 235/386
2003/0173404 A1* 9/2003 Chung et al. ................ 235/386
2004/0181675 A1* 9/2004 Hansen ....................... 713/182

OTHER PUBLICATIONS

David Chaum & Jan-Hendrik Evertse, "A Secure and Privacy-Protecting Protocol for Transmitting Personal INformation Between Organizations," A.M. Odlyzko (Ed.): Advances in Cryptology, CRYPTO '86, LNCS 263, 1987, pp. 118-167.

David L. Chaum, "Untraceable Electronic Mail, Return Addresses, and Digital Pseudonymns," Communication of the ACM, vol. 24, No. 2, 1981, pp. 84-88.

* cited by examiner

SYSTEM AND METHOD FOR ESTABLISHING AND MANAGING RELATIONSHIPS BETWEEN PSEUDONYMOUS IDENTIFICATIONS AND MEMBERSHIPS IN ORGANIZATIONS

This application is a continuation-in-part of U.S. application Ser. No. 09/795,968 filed Mar. 1, 2001 (the "parent application"), which is itself a continuation-in-part of U.S. Ser. No. 09/686,516 filed Oct. 11, 2000 (the "grandparent application"), which are both incorporated herein by reference in their entirety.

BACKGROUND

1. Field of the Invention

The present invention relates generally to electronic communities where individuals interact and exchange communications over local and world-wide networks. More particularly, the present invention relates to electronic identities and reputations established within such electronic communities.

2. Background of the Invention

Electronic communities have been used in the art to facilitate communications between two or more people. Electronic communities typically allow for exchange of information, ideas and opinions over an extended period of time, i.e., a discussion about a particular topic may be initiated by an individual posting a message on day one, and subsequent discussion participants may receive, view or respond to the message at a later date. Electronic communities are similar to non-electronic communities in that members of each electronic community can establish a reputation based on their participation within the community.

An electronic community generally provides one or more discussion forums and individual forums may be dedicated to particular topics. An electronic discussion forum may allow even participants new to the forum to review past discussion messages and therefore to fully participate in the forum. Well-known examples of such communities and electronic forums include Web-based and proprietary message boards (both public and private), USENET news groups, and electronic mailing lists. These electronic communities and discussion forums support both synchronous and asynchronous discussions, i.e., one or more participants may inject communications into the discussion at the same time, or nearly the same time, without disrupting the flow of communications. This allows each individual electronic discussion forum to be rich with communications spanning a wide variety of topics and subjects.

Other communities and electronic discussion forums may facilitate more traditional asynchronous-like communications by providing, e.g., interactive chat sessions. In these electronic communities and discussion forums, participants are typically online at the same time and are actively responding to messages posted by others. These discussion forums are similar to a traditional telephone discussion in that the information in exchanged in real-time. However, a significant difference is that the electronic discussion forums are, by their nature, written or recorded message transmissions, which may be saved for historical records or for analysis at a future date.

Although most electronic communities require each user to select an identity that is unique within a particular community, there are not currently any practical means for the user to correlate his or her electronic identity in one community or forum with his or her electronic identities in other communities or forums. This problem is addressed in the co-pending parent and grandparent applications and the co-pending application for a "System And Method For Establishing And Evaluating Cross-Community Identities In Electronic Forums," filed Jun. 13, 2001, which is also incorporated herein by reference in its entirety. Another problem with the state of the art stems from one of the well-known benefits of electronic communities: the ability for users to maintain separation between their physical identity and their on-line identity or identities. Such anonymity is a cherished attribute of the modern electronic world and allows users the freedom to participate in a wide variety of discussion forums without being subjected to harassment or other unwelcome attention in realms outside of their participation in electronic communities and forums. A problem however arises when an individual wishes to "speak" in an electronic community or forum as a bona fide member of some organization without revealing his or her actual identity.

In the current state of the art, a user participating in an electronic community or forum may claim membership in a particular organization or group of organizations. However, the user cannot currently "prove" such membership without either revealing his or her true identity in the electronic mediums. Moreover, if the user claims some special authority to speak on behalf of the organization, there is currently no way for the user to establish his or her authority while still retaining anonymity with the electronic mediums. This presents a problem for both the users and organizations, neither of which have heretofore been able to establish and manage relationships between pseudonymous identities in electronic mediums and memberships in those organizations.

SUMMARY OF THE INVENTION

The present invention provides a system and method for establishing and managing relationships between pseudonymous identities in electronic mediums such as electronic communities and discussion forums and memberships in organizations. Both users and organizations can use the system and method of the present invention to provide assurance to other users of electronic mediums that communications from a particular user claiming membership in an organization can be trusted as communications from a bone fide member of the organization. Further, the present invention allows the organization to establish a pool of "official" spokespersons that may issue communications on behalf of the organization without the need to reveal the actual identities of the members in the pool.

DETAILED DESCRIPTION OF THE INVENTION

An embodiment of the present invention allows a member of an organization to establish a pseudonymous identity that is bonded, i.e., related, to one or more organizations. Accordingly, an embodiment of the invention allows an organization member to interact with other individuals and/or service providers on electronic forums, such as the Internet, as an official member of the organization without revealing his/her true identity.

Definitions

Member—An individual who is a member of one or more organizations and wishes to use a pseudonymous identity that is linked with that organization to interact with other individuals or organizations via an electronic medium such as the Internet.

Organization—Any entity that wishes to allow its members to use pseudonymous identities to interact with other individuals or organizations in electronic mediums. An organization can be, for example, but is not limited to, a non-profit organization, a company, a government or government agency, an organized religious group, or any other such groups of people having common interests and a centralized or semi-centralized body maintaining membership data. An organization that does not maintain such data could also benefit from the present invention, provided it has a means to decide who are valid members of the organization.

Authentication Authority—a body that distributes pseudonymous identities to members and maintains the relationship between members and organizations.

Electronic Medium—any publicly accessible storage location where users can post documents that can be viewed by other individuals. Documents include both formal documents and informal messages that are may be posted to forums as part of ongoing discussions about a particular topic.

Reader—any individual that reads a document that is posted on a public forum by a Member or that receives a document directly from a Member.

Membership Token—A key that can be distributed to an organization's members to server as proof that the individual is a member of the organization. The membership token is preferably a single-use digital key.

Signature—An attachment to an electronic document that verifies that the document was created by a particular individual (or pseudonym).

Discussion Application—Software that allows individuals to read and post documents (messages) to public discussion forums.

System Operation

Figure 1:
FIG. 1 is a functional diagram showing a registration process in an embodiment of the present invention.

FIG. 1 is a first portion of a functional diagram showing how an embodiment of the present invention may be operated. FIG. 1 shows the relationship between an organization 10 wishing to avail itself of the benefits of the present invention and an authentication authority 20. The organization registers with the authentication authority by providing relevant information about the organization. Examples of such information may include the name of the organization, the location of the organization and contact information for the organization and information that can be used to authenticate the organization must be specified during the registration. For example, a login and password may be assigned for use by an administrator at the organization that will be utilized to authenticate the administrator prior to future transactions. Once registered, the organization's administrator would provide the assigned login and password before performing any privileged functions related to the organization.

In exchange for registering with the authentication authority, an organization receives a plurality of membership tokens that can be used by the organization's members to establish a right to claim membership in the organization. In a preferred embodiment, each membership token is a "one-time only" token which, once used by an individual member of the organization can not be successfully used by another member. Membership tokens may operate in an analogous fashion to software license keys commonly used to prove authorization to use a particular software application or suite of applications. Each membership token is encoded with a checksum to prevent a member from typing the token incorrectly and to provide an additional level of security. A typical membership token may comprise a unique string or series of alphanumeric characters. A token may be encoded with some information that ties it to the organization. Alternatively, when tokens are generated, each token is stored in a central data store and associated with the organization.

Further, membership tokens may include different levels of membership to distinguish classes of memberships. For example, organization 10 may have three membership levels, A, B and C. Class A members may have more authority to speak for the organization—for example, they may comprise the organization's founding members. Alternatively, class A members may not have any special rights within an electronic community and yet may still wish to speak as a class A member of the organization. When organization 10 registers with authentication authority 20, it identifies the classes of memberships it wishes to offer to its members. The authentication authority then distributes different sets of membership tokens for each such class. Functionally, such varying classes of membership could be managed as separate organizations. That is, internal data structures maintained by authentication system 20 may treat each organization and subclass as a distinct organization. This implementation allows the authentication authority to easily adapt to different classes of membership if organizations so desire. Alternatively, the authentication authority may establish special data structures to manage the organization as a single entity have multiple classes of membership.

Figure 2:
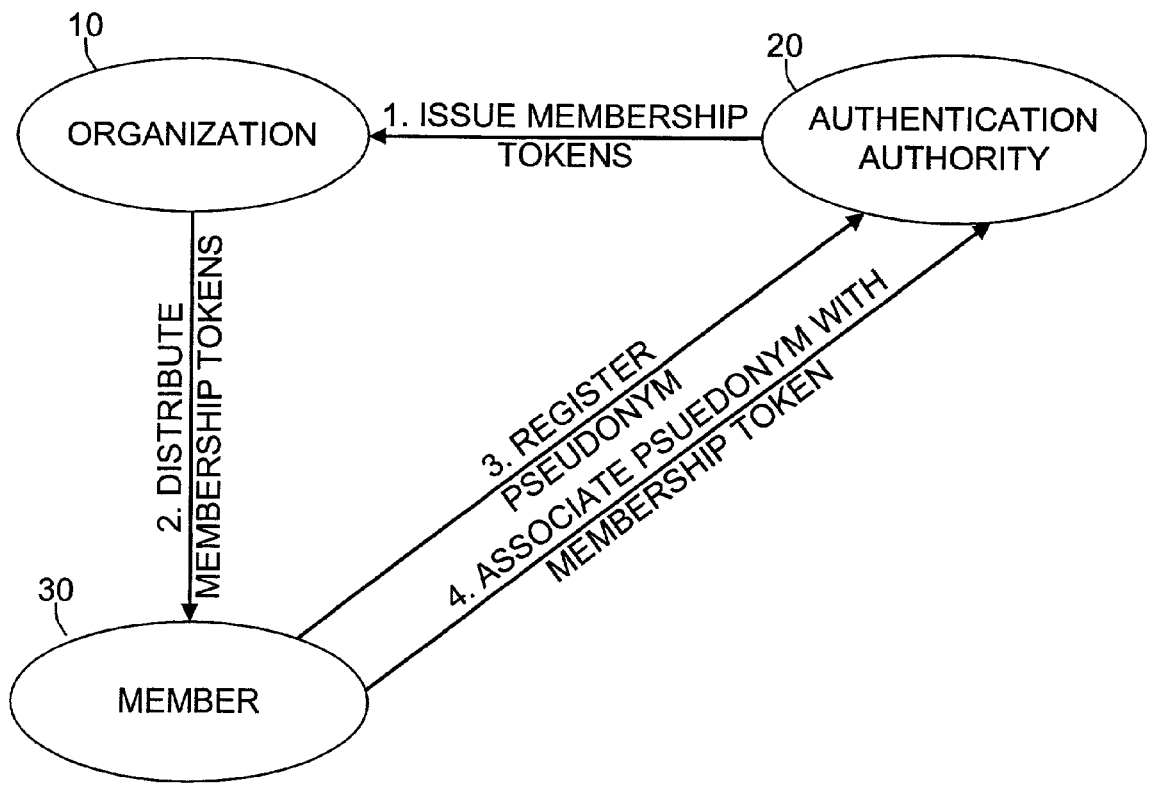
FIG. 2 is a functional diagram showing the steps a user and an organization could take to establish a relationship between the user and the organization in an embodiment of the present invention.

FIG. 2 shows the steps which may be performed to allow a member 30 of an organization 10 to establish a relationship between his or her pseudonymous identities and that membership status. As shown in FIGS. 1 and 2, organization 10 first registers with an authentication authority 20 (step 1 in FIG. 1) and receive membership tokens for distribution to members (step 1 in FIG. 2). Organization 10 then distributes a membership token to member 30. The criteria used by organization 10 to distribute membership tokens is completely at the discretion of the organization. For example, it may charge a premium to members receiving tokens or it may offer the tokens to every member requesting one.

Moreover, as described in more detail below, the organization may distribute membership tokens having an expiration date to better control a user's ability to claim membership in the organization.

As shown in step 2 of FIG. 2, organization 10 distributes the membership tokens to member 30. Organization 10 may print its tokens on paper and distribute them to members by hand. Alternatively, organization 10 may electronically distribute tokens to its member. Regardless of the means of distributing tokens, organization 10 may also include a URL that can be utilized by members to activate their membership.

If member 30 has not already done so, he or she registers a pseudonym with authentication authority 20. Such registration may be accommodated via a web server or other computer system accessible by member 30. Authentication authority 30 may request certain information from member 30 to complete the registration process (step 3). In a preferred embodiment, authentication authority 30 need not collect any personal identification information. For example, a registration process may include a request for the member to provide a valid email address and to choose a password for authentication when the member wishes to change his or her membership associations. In this manner, member 30 may protect his or her true identity from the authentication authority. When a pseudonym is registered, a public/private key pair may also be generated for the pseudonym. This key pair can be used by the member when posting documents to an electronic forum on which he or she wishes to include a digital signature associated with the pseudonym.

After member 30 has registered a pseudonym with authentication authority 20, the member then associates the pseudonym with the member's organization by providing the membership token distributed by the organization (step 4). As described above, in a preferred embodiment, the membership token is only valid for a single use. This prevents a member from sharing the token with others. Further, in another embodiment the membership token may have a limited life span to prevent misuse. In this embodiment, a token may be "activated" by either authentication authority 30 upon issuance of the token to organization 10, or by organization 10 upon distribution of the token to a member.

To further protect member 30's privacy, in a preferred embodiment, authentication authority 20 only uses the membership token to complete the association process. Once the member's pseudonym is associated with an organization, there is no longer any way to tie the member's actual identity back to the pseudonym. Accordingly, even if an organization maintains records in an effort to tie members' pseudonymous communications to the actual member, the pseudonyms' real identities can be protected. The association between the pseudonym and the organization is recorded in a central data store.

The steps shown in FIG. 2 may be repeated as often as member 30 likes. That is, member 30 can associate many memberships with a single pseudonym, provided he or she obtains valid membership tokens from each organization to be associated with the pseudonym. Also, member 30 may register more than one pseudonym and associate memberships with each pseudonym. If the membership token is a use-once token, then the member would have to obtain additional tokens from those organizations being associated with multiple pseudonyms.

Figure 3:
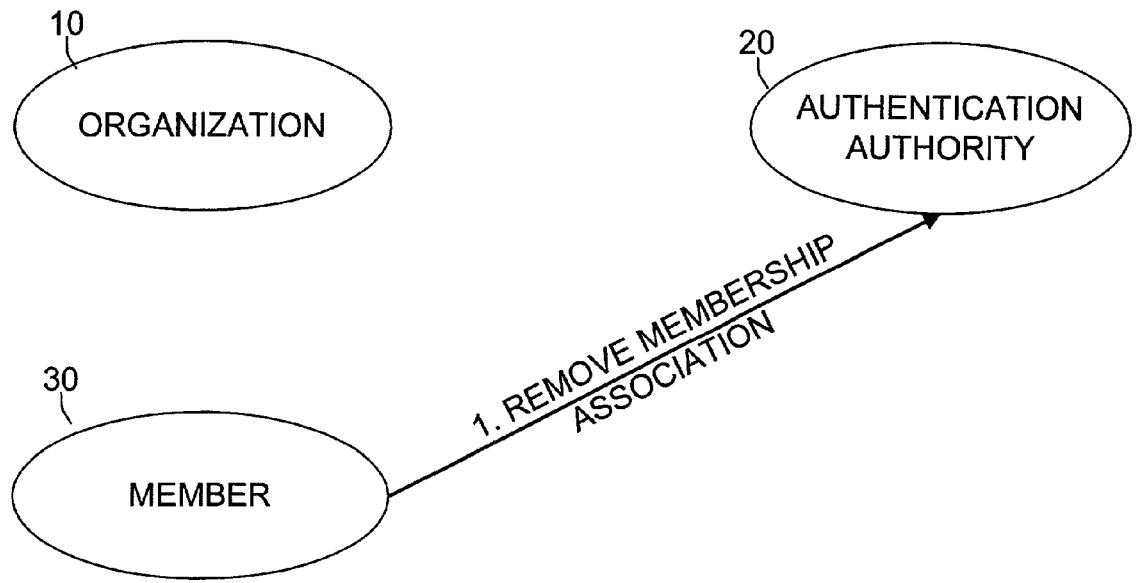
FIG. 3 is a functional diagram showing a deregistration process in an embodiment of the present invention.

In an embodiment of the present invention, member 30 may remove the association between his or her pseudonym and the organization as shown in FIG. 3. In a preferred embodiment, member 30 is authenticated to insure that the request to remove an association is made by the rightful owner of the pseudonym prior to this operation. As shown in FIG. 3, organization 10 need not be involved in the transaction to effect disassociation of member 30's pseudonym to the organization. Accordingly, removal of the tie between the pseudonym and the organization does not affect the member's actual membership status in the organization.

Figure 4:
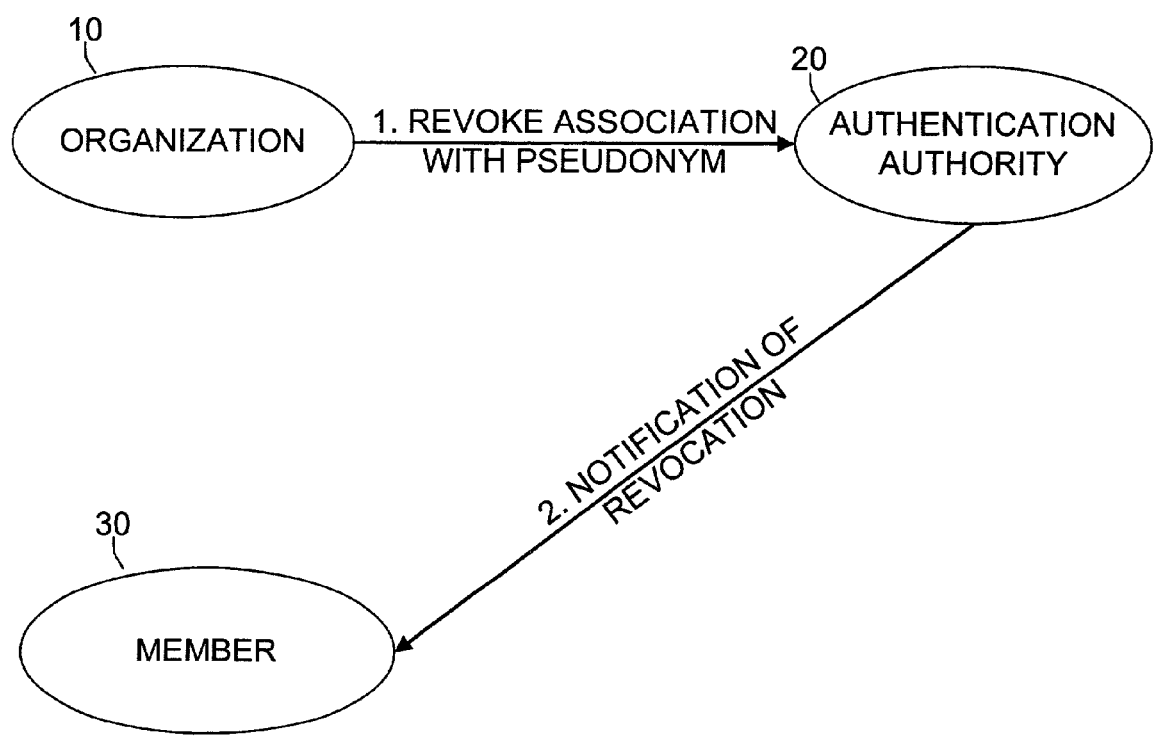
FIG. 4 is a functional diagram showing the steps that may be performed in an embodiment of the present invention to allow an organization to disassociate a user from the organization.

In an embodiment of the present invention, an organization may revoke permission for a particular pseudonym to be identified with the organization. As shown in FIG. 4, organization 10 may send a message to authentication authority 20 requesting the authority to disassociate a particular pseudonym from the organization. As described above, organization 10 has no way of knowing the actual identity of the member to be "banished" from the organization. Accordingly, such revocation does not affect the member's actual status as a member of the organization. In a preferred embodiment of the present invention, authentication authority 20 sends a notice to member 30 after completing the disassociation process.

In an embodiment of the present invention, a system and method are provided for renewing an association between a pseudonym and an organization. In another embodiment of the present invention, organization 10 may specify that memberships never expire. A renewal process may be used in embodiments wherein the membership is only valid for a limited period. In such embodiments, organization 10 may specify the duration of the membership. For example, many organizations require payment of annual dues to maintain membership in the organization. In this instance, at the time the organization registers with the authentication authority, it may specify that the association between each member's pseudonym and the organization will expire (become inactivate) on a certain date or after a certain period. Accordingly, authentication authority 20 issues tokens having an expiration period. When a member uses such a token, authentication authority 20 registers the association together with the expiration date or duration.

Figure 5:
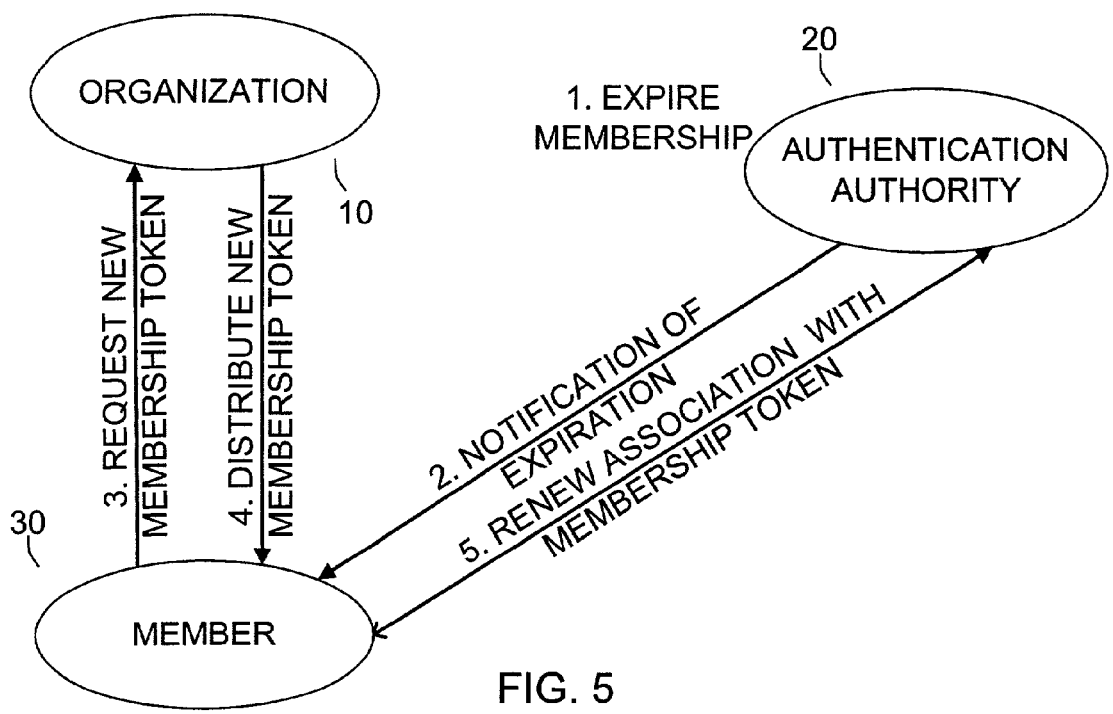
FIG. 5 is a functional diagram showing the steps that may be performed in an embodiment of the present invention to allow a user to renew membership in an organization.

When the expiration date approaches, authentication authority 20 marks the association between a member's pseudonym and the organization as expired in step 1 shown in FIG. 5. Authentication authority 20 sends a notification of the expiration to the pseudonym's email address in step 2 of FIG. 5. In one embodiment, authentication authority 20 sends a notification message prior to the expiration date to allow member 30 sufficient time to renew his or her membership before the association is removed from the system.

Member 30 contacts organization 10 to request a new membership token (step 3 in FIG. 5). In step 4, organization 10 distributes a new membership token to member 30. In step 5, the member renews the association of his or her pseudonym with the organization by contacting authentication authority 20 as described earlier.

Publish Document

Figure 6:
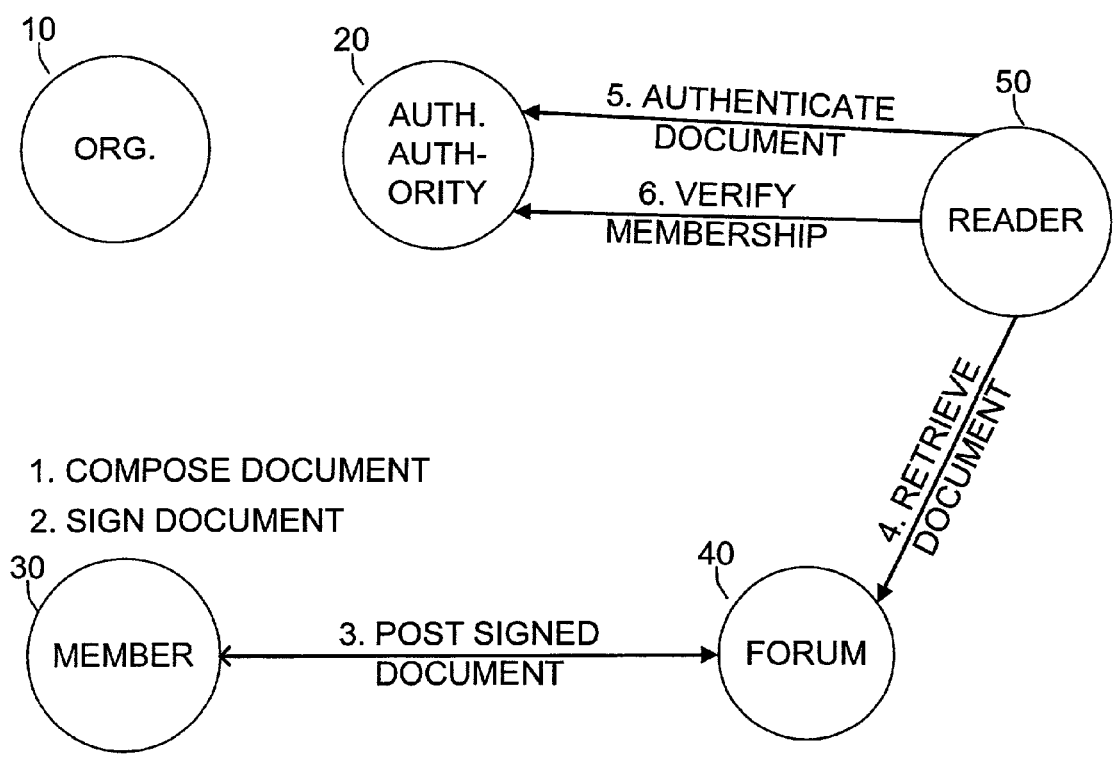
FIG. 6 is a functional diagram showing the steps that may be performed in an embodiment of the present invention to allow a reader to authenticate a document and to verify the poster's membership in an organization.

FIG. 6 shows the steps involved in an embodiment of the present invention when a user retrieves a document published by a pseudonym having a membership recorded with an authentication authority. As used herein, publication means posting a message or document on a public forum where another individual can read it. As shown in FIG. 6, member 30 may compose and sign a document to be posted on an electronic forum (steps 1 and 2 in FIG. 6). Prior to posting the document, the member electronically signs the document with his/her pseudonym so that readers of the document can authenticate the document as being published by the pseudonym. A discussion application (described in more detail in the System Implementation section, below) can be used by member 30 to compose a document and then to post the document to a public discussion forum. In an embodiment of the present invention, the discussion application is adapted to issue a request to authentication authority 20 to have the document digitally signed before it is posted to the forum.

If requested, authentication authority 20 computes a digital signature from the content of the message, the pseudonym of the member posting the document, and the date the document was posted. Authentication authority 20 then returns the digital signature to the discussion application where the document may be combined with the signature and posted to a discussion server. In step 3, member 30 posts the document to electronic forum 40 with the signature attached. Once the signed document is posted to electronic forum 40, it is available to other users of the forum, including e.g., reader 50

Reader 50 may use a discussion application to read the document. Information about the poster of the document can be displayed including the pseudonym that posted the message and the organizations in which the claims membership. The reader may also use the discussion application to verify the digital signature of the message. To accomplish this, the discussion application sends a validation request to the authentication authority with the digital signature for verification. The response to the request indicates whether or not the document was actually posted by the pseudonym. When reader 50 retrieves the document from electronic forum 40 (step 4), he or she may submit the signed document to authentication authority 20 where the signature can be authenticated (step 5). Further, reader 50 may verify that the author of the document (i.e., the posting pseudonym) is a member of organization 10 by issuing an appropriate request to authentication authority 20, as shown in step 6 in FIG. 6. Organization 10 need not be involved in either the authentication or verification steps as shown in FIG. 6.

System Implementation

Figure 7:
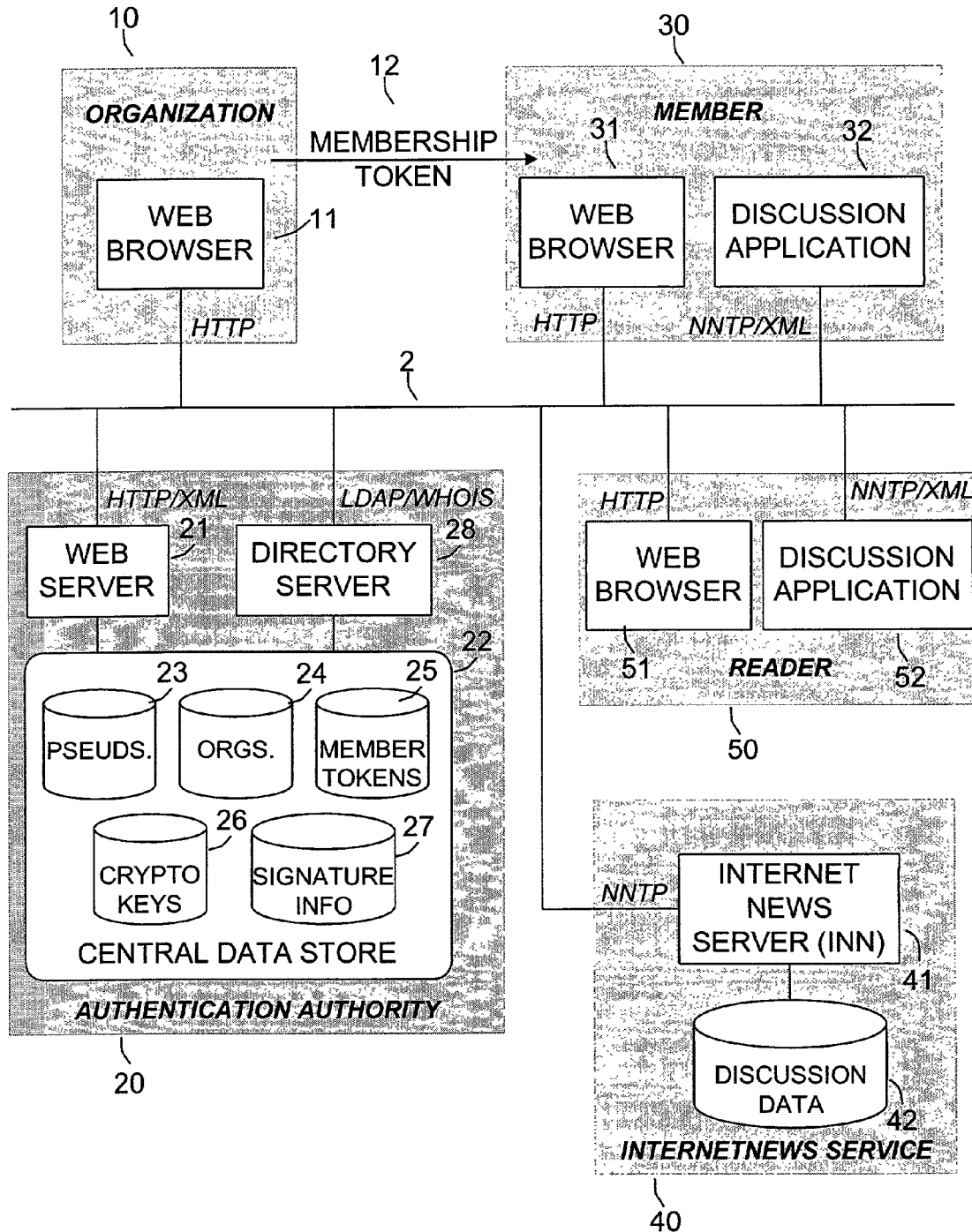
FIG. 7 is a schematic diagram showing an architecture that may be used to implement an embodiment of the present invention.

An embodiment of the present invention may be implemented using an architecture such as shown in FIG. 7. In this exemplary embodiment, network 2 is utilized to provide connectivity between organization 10, member 30, reader 50 and authentication authority 20. Network 2 may be any suitable network providing such connectivity, such as, e.g., the Internet. Organization 10 communicates with authentication authority 20 using any suitable communications application and or protocols supported by network 2. For example, organization 10 may use web browser 11 and the well-known HTTP protocol to interface web server 21 operated by authentication authority 20. Web browser 11 and web server 21 may be any standard Web browser and server applications. Web server 21 may include support for both HTTP and XML pages which guide organization 10 through the initial registration process and any subsequent administration performed by organization 10. For example, organization 10 may use web browser 11 to access web server 21 to request disassociation of a particular pseudonym or to request additional membership tokens.

Web server 21 has access to central data store 22 which may also be maintained by authentication authority 20. Central data store 22 may comprise one or more databases such as pseudonym database 23, organization database 24, membership token database 25, encryption key database 26 and signature information database 27. Each of databases 23–27 may comprise a single database or may be separate databases as shown in FIG. 7. Central data store 22 may be a relational database, such as, e.g., an Oracle database. Alternatively, central data store 22 may comprise one or more data files for storing information used to implement the present invention.

Pseudonym database 23 can be used to store information about each pseudonym registered according to the present invention. Information stored in database 23 may include, e.g., the pseudonym, an email address for the pseudonym, an identifier for each association associated with the pseudonym, any other information that may be collected from the pseudonym for use with the present invention or for other purposes.

Organization database 24 comprises data collected from the organization upon registration with the authentication authority. Other information may be included in database 24, such as a list of all pseudonyms currently associated with the organization, a policy record comprising the organizations expiration and renewal procedures, and other information concerning the services provided to the organization by authentication authority 20.

Membership tokens database 25 may comprise a list of membership tokens 12 to be distributed and may include a cross-reference to tokens that have already been distributed identifying the organization and, if applicable, the expiration period for the tokens.

Encryption database 26 and signature information database 27 are described in greater detail in later sections below.

Member 30 (also referred to herein as "user 30") communicates with authentication authority 20 using any suitable communications application and/or protocols supported by network 2. Member 30 may also communicate with organization 10 to receive membership token 12 as shown in FIG. 7. This communication may be an electronic communication, a verbal communication, a written communication or other means to pass the token from organization 10 to member 30.

In an embodiment such as shown in FIG. 7, user 30 may use a standard web browser 31 to perform all administrative functions with authentication authority 20. In addition to web browser 31, member 30 member uses discussion application 32 to publish documents (messages) to a public forum. Discussion application 32 may be for example, a web browser application, an email application, a newsgroup application, or other such specialized or non-specialized applications allowing member 30 to publish documents on an electronic discussion forum. In the embodiment shown in FIG. 7, discussion application 32 is newsgroup application using the well-known NNTP or XML protocols supported by network 2. Moreover, for illustrative purposes, FIG. 7 shows electronic forum 40 comprising Internet News Server (INN) 41 and discussion database 42. Again, the electronic discussion forum is not limited to newsgroup-type forums but may comprise may other electronic discussion forums including but not limited to newsgroups, bulletin boards, conferencing systems, and the like.

In an embodiment of the present invention, discussion application 32 is also adapted to interface with a public key infrastructure (PKI) system to enable member 30 to digitally sign documents that are being published. Alternatively, member 30 may manually intervene to place digital signatures on the documents. The PKI system may operate in conjunction with the pseudonym-organization association system of the present invention, as shown in FIG. 7. In this case, discussion application 32 is adapted to interface with authentication authority 20.

Reader 50 may use discussion application 52 to read documents published in electronic forum 40. In addition to standard discussion functionality (read/post/etc.), discussion application 52 may include functionality to verify digital signatures for messages that have been posted by members. In this case, discussion application 52 is adapted to interface with a PKI system or with authentication authority 20 as shown in FIG. 7.

In addition to the elements described above, authentication authority 20 may also comprise directory server 28 as shown in FIG. 7. Directory server 28 may be accessed by organization 10, member 30 or reader 50 via web browser 11, 31 or 51, respectively. Further, member 30 and reader 50 may use discussion application 32 or 52, respectively, to interface with directory server 28. Directory server 28 can be used to provide enhanced user directory services, including for example, locating a pseudonym or organization and/or providing additional information about a pseudonym or an organization. Directory server 28 may use the well-known Lightweight Directory Application Protocol (LDAP) or other protocol such as used in the well-known "whois" services.

Exemplary Applications of the Present Invention

The present invention may be advantageously used in a variety of applications. For example, a corporation may implement a system for associating pseudonyms with particular marketing feedback/focus groups. In this instance the corporation may serve as the authentication authority, or it may use an authentication authority provided by some third party. The focus group could be registered as an "organization" according to the present invention and individual members of the focus group would receive membership tokens associated with the focus group. The members of the focus group may then establish a pseudonymous association with the focus group as described herein. By doing so, the members of the group can freely provide feedback to the corporation without being individually identified. Moreover, the corporation can be assured that any such feedback received originated with a bona fide member of its focus group. Such an ability to obtain pseudonymous feedback online may result in more accurate feedback because group members may feel more free to express complete opinions knowing that they will not be singled out for undesired marketing calls or for other undesired attention from the corporation.

In addition to such marketing focus groups which may be primarily directed at consumers or customers, the present invention may also be used to create a pseudonymous suggestion box. In this case, a corporation could issue membership tokens to employees who could then associate an pseudonym with the corporation and provide anonymous comments to an electronic suggestion box. The corporation could also distribute membership tokens to employees according to their business unit or work areas so as to receive more meaningful feedback from groups of employees.

In another example, the present invention is well-suited for electronic voting applications. For example, a student government organization may issue voter (i.e., membership) tokens to students eligible to vote in student elections. The students could then associate a pseudonym with the student organization and vote electronically. Other elections where membership in a particular party or organization is required for voting could also use an embodiment of the present invention. For example, in some primary elections, only registered member the political party involved may eligible to cast a vote for party representatives. In such a case, the present invention could be used to facilitate an electronic voting system that preserves the anonymity of the voter while assuring the voter's membership in the class of eligible voters.

An electronic voting system, such as described above, could be monitored or recorded by an election authority or some other trustworthy agency. In one embodiment, when voter receives a voter token from his election authority, the token may only be valid to associate a pseudonym with a particular a particular voting precinct or other group of eligible voters. In another embodiment, the voter token may only be valid to associate a voter's pseudonym to a particular election activity.

In another example, the present invention may be used by online dating services or electronic discussion environments that allow participants the opportunity to become more acquainted with one another prior to revealing their actual identities. In many such environments, participants desire heretofore conflicting needs: (1) a need for anonymity, and (2) need for some assurance that the person they are interested in belongs to whatever category claimed (male, female, certain age-group, etc.). The present invention is ideally suited for meeting both needs. The participants could provide verification to some trusted third party (such as, e.g., the dating service provider, or some other entity in a position to issue membership tokens to individuals based on the verified class). The trusted third party would of course register the class as an "organization" with an authentication authority. The participants would then associate a pseudonym with the authentication authority enabling others to verify the association between the class and the pseudonym.

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The foregoing disclosure of embodiments and exemplary applications of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for providing assurance that an electronic pseudonym belongs to a member of a particular organization, said method comprising the steps of:

registering the organization with an authentication authority;

distributing a membership token from the authentication authority to the organization;

distributing the membership token to the member;

registering the pseudonym with the authentication authority; and associating the pseudonym with the organization using the membership token to establish a relationship between the pseudonym and membership in the organization, thereby enabling a user of the pseudonym to communicate in an electronic forum or community as an authorized member of the organization while protecting the user's identity from other participants in the electronic forum or community, wherein other participants in the electronic forum or community are able to validate that the user of the pseudonym is a member of the organization via the authentication authority, wherein the membership token is useable to establish the relationship between the pseudonym and membership in the organization for various electronic forums or communities, such that the user of the pseudonym is able to communicate as an authorized member of the organization across multiple electronic forums or communities.

2. The method of claim 1, wherein the membership token comprises a unique string of alphabetical and numerical characters.

3. The method of claim 1, wherein the membership token comprises an encoded identifier of the organization.

4. The method of claim 1, wherein the step of associating the membership with the organization comprises the steps of receiving a log-in by a user on a computer system at the authentication authority; verifying a permission of the user to manage the pseudonym; and receiving the membership token from the user.

5. The method of claim 4, further comprising the steps of retrieving an identification of the organization from a database comprising membership tokens and corresponding organizations.

6. The method of claim 4, further comprising the step of decoding the membership token to determine the identity of the organization to be associated with the pseudonym.

7. The method of claim 1, wherein the membership token comprises an expiration date.

8. The method of claim 7, further comprising the step of verifying that the membership token has not expired before performing the step of associating the pseudonym with the organization.

9. The method, of claim 1, wherein the association of the pseudonym with the organization has an expiration period.

10. The method of claim 9, further comprising the steps of notifying the member when the expiration period has passed.

11. The method of claim 1, wherein the association of the pseudonym with the organization has an expiration date.

12. The method of claim 11, further comprising the steps of notifying the member when the expiration date has passed.

13. The method of claim 11, further comprising the steps of notifying the member prior to the expiration date being reached.

14. The method of claim 1, further comprising the steps of receiving at the authentication authority a revocation notice from the organization and removing the association of the pseudonym with the organization according to the revocation notice.

15. The method according to claim 1, wherein said step of associating enables the user of the pseudonym to communicate in the electronic forum or community as an authorized member of the organization while protecting the user's identity from the organization.

16. The method according to claim 1, wherein another participant in the electronic forum or community validates that the user of the pseudonym is a member of the organization by sending a verification request to the authentication authority.

17. A method for providing assurance that a document posted to an electronic forum by a user belonging to a particular organization, wherein the user posts the electronic document using a pseudonymous identity, said method comprising the steps of:

registering the organization with an authentication authority;

distributing a membership token from the authentication authority to the organization, in response to the step of registering the organization;

receiving at the authentication authority a communication comprising the membership token and the pseudonymous identity, said communication being sent by the user;

associating, at the authentication authority, the pseudonymous identity with the organization to establish a relationship between the pseudonym and membership in the organization, thereby enabling a user of the pseudonym to post documents in an electronic forum as an authorized member of the organization while protecting the user's identity from other participants in the electronic forum;

providing the user with a means for electronically signing the document using the pseudonymous identity;

verifying that the document was electronically signed using the pseudonymous identity; and providing verification to a reader of the document that the pseudonymous identity is associated with the organization;

wherein said membership token is useable to establish the relationship between the pseudonym and membership in the organization for various electronic forums, such that the user is able to post documents as an authorized member of the organization across multiple electronic forums.

18. The method of claim 17, wherein the membership token comprises a unique string of alphabetical and numerical characters.

19. The method of claim 17, wherein the membership token comprises an encoded identifier of the organization.

20. The method of claim 17, wherein the step of associating the pseudonymous identity with the organization comprises the steps of receiving a log-in by the user on a computer system at the authentication authority; verifying a permission of the user to manage the pseudonymous identity; and receiving the membership token from the user.

21. The method of claim 20, further comprising the steps of retrieving an identification of the organization from a database comprising membership tokens and corresponding organizations.

22. The method of claim 20, further comprising the step of decoding the membership token to determine the identity of the organization to be associated with the pseudonymous identity.

23. The method of claim 17, wherein the membership token comprises an expiration date.

24. The method of claim 23, further comprising the step of verifying that the membership token has not expired before performing the step of associating the pseudonymous identity with the organization.

25. The method of claim 17, wherein the association of the pseudonymous identity with the organization has a pre-determined life-span.

26. The method of claim 25, further comprising the steps of notifying the pseudonymous identity when the pre-determined life-span has been exceeded.

27. The method of claim 17, wherein the association of the pseudonymous identity with the organization has an expiration date.

28. The method of claim 27, further comprising the steps of notifying the pseudonymous identity when the expiration date has passed.

29. The method of claim 27, further comprising the steps of notifying the pseudonymous identity prior to the expiration date being reached.

30. The method of claim 17, further comprising the steps of receiving at the authentication authority a revocation notice from the organization and removing the association of the pseudonymous identity with the organization according to the revocation notice.

31. The method according to claim 17, wherein said step of associating enables the user of the pseudonym to post documents in the electronic forum as an authorized member of the organization while protecting the user's identity from the organization.

32. An authentication authority for providing assurance that an electronic pseudonym belongs to a member of a particular organization, said authentication authority comprising:
a database of registered organizations;
a database of membership tokens assigned to each registered organization; and
a database of associations between electronic pseudonyms and registered organizations,
wherein the database of associations between electronic pseudonyms and organizations is populated when the authentication authority receives a communication comprising a membership token and an electronic pseudonym to establish a relationship between the pseudonym and membership in the organization, thereby enabling a user of the pseudonym to communicate in an electronic forum or community as an authorized member of the organization while protecting the user's identity from other participants in the electronic forum or community,
wherein other participants in the electronic forum or community are able to validate that the user of the pseudonym is a member of the organization via the authentication authority,
wherein the membership token is useable to establish the relationship between the pseudonym and membership in the organization for various electronic forums or communities, such that the user of the pseudonym is able to communicate as an authorized member of the organization across multiple electronic forums or communities.

33. The authentication authority of claim 32, wherein the particular organization comprises a plurality of voters registered by an election authority.

34. The authentication authority of claim 32, wherein the authentication authority further comprises an electronic dating service and wherein the particular organization comprises a plurality of people sharing a common trait.

35. The authentication authority of claim 32, further comprising programming logic for distributing a membership token to an organization when the organization registers with the authentication authority.

36. The authentication authority of claim 32, wherein said database of associations between electronic pseudonyms and registered organizations enables the user of the pseudonym to communicate in the electronic forum or community as an authorized member of the organization while protecting the user's identity from the organization.

37. The authentication authority according to claim 32, wherein another participant in the electronic forum or community validates that the user of the pseudonym is a member of the organization by sending a verification request to said authentication authority.

38. A system for providing assurance that a document posted to an electronic forum by a user belonging to a particular organization, wherein the user posts the electronic document using a pseudonym, said system comprising:
a computer system comprising a memory and a processor;
a database comprising registered organizations, registered pseudonyms, and membership tokens;
a means for distributing a membership token from the computer system to an organization;
a means for the computer system to receive a communication comprising the membership token and the pseudonym, said communication being sent from the user;
a means for associating the pseudonym with the organization in the database to establish a relationship between the pseudonym and membership in the organization, thereby enabling a user of the pseudonym to post documents in an electronic forum as an authorized member of the organization while protecting the user's identity from other participants in the electronic forum;
a means for electronically signing the document with the pseudonym;
a means for verifying that the document was electronically signed with the pseudonym; and
a means for providing verification to a reader of the document that the pseudonym is associated with the organization;
wherein said membership token is useable to establish the relationship between the pseudonym and membership in the organization for various electronic forums, such that the user is able to post documents as an authorized member of the organization across multiple electronic forums.

39. The system according the claim 38, wherein said system enables the user of the pseudonym to post documents in the electronic form as an authorized member of the organization while protecting the user's identity from the organization.

* * * * *